United States Patent [19]

Herndon

[11] Patent Number: 4,667,904
[45] Date of Patent: May 26, 1987

[54] TORSO RESTRAINT WITH IN FLIGHT AND EJECTION ACTIVATION MODES

[75] Inventor: Gerald F. Herndon, Bellevue, Wash.

[73] Assignee: The Boeing Company, Seattle, Wash.

[21] Appl. No.: 656,039

[22] Filed: Sep. 28, 1984

[51] Int. Cl.$^4$ .................. B64D 11/06; B64D 25/04; A62B 35/00

[52] U.S. Cl. ............................ 244/122 R; 92/46; 92/48; 280/733; 280/801; 280/806; 297/469; 297/480; 297/479; 244/122 AG; 244/141

[58] Field of Search ............. 244/122, 141; 254/228; 280/733, 743, 753, 801, 806; 297/478, 476, 480, 468, 469, 484, 471; 92/34, 35, 43, 45, 46, 48; 441/40; 52/2; 383/3

[56] References Cited

U.S. PATENT DOCUMENTS

| | | | |
|---|---|---|---|
| 755,747 | 3/1904 | Coile | 383/3 |
| 1,295,471 | 2/1919 | Fleury | 92/43 |
| 2,680,476 | 6/1954 | Saffell | 155/189 |
| 2,892,602 | 6/1959 | Servanty | 244/141 |
| 3,096,957 | 7/1963 | Peterson et al. | 244/122 |
| 3,355,127 | 11/1967 | Stanley et al. | 244/122 |
| 3,386,683 | 6/1968 | Howland | 242/107.4 |
| 3,389,873 | 6/1968 | Filippi et al. | 244/122 R |
| 3,488,090 | 1/1970 | Douglas | 297/389 |
| 3,522,918 | 8/1970 | Wrighton | 244/122 |
| 3,698,670 | 10/1972 | Ewing | 244/122 |
| 3,879,054 | 4/1975 | Lindblad | 297/480 |
| 3,905,615 | 9/1975 | Schulman | 280/150 |
| 3,918,545 | 11/1975 | Andres et al. | 244/122 B |
| 3,948,541 | 4/1976 | Schulman | 280/150 |
| 3,954,234 | 5/1976 | Frost et al. | 244/151 |
| 4,004,763 | 1/1977 | Brunnell, III et al. | 244/122 |
| 4,175,723 | 11/1979 | Shea, Jr. | 244/162 |
| 4,232,886 | 11/1980 | Tsuge et al. | 280/806 |
| 4,396,228 | 8/1983 | Go | 297/484 |
| 4,437,628 | 3/1984 | Schwartz | 244/122 |
| 4,518,015 | 5/1985 | Fischer | 52/2 |

Primary Examiner—Galen Barefoot
Assistant Examiner—Lynn M. Fiorito
Attorney, Agent, or Firm—Joan H. Pauly

[57] ABSTRACT

In the operation of modern tactical aircraft, crew members are subjected to periodic high acceleration loads that cause fatigue and a decrease in operating capacity. Restraining the torso of a crew member and pulling the crew member back against the ejection seat (2) of the aircraft would help prevent such fatigue. Known restraint and haul back apparatus for use during ejection are not adapted for repeated in flight use. The invention provides a single mechanism that retracts torso restraint straps (6) any number of times during in flight maneuvering and also retracts straps (6) for ejection. A loop (7) of each strap (6) extends around an inflatable member (28). When in flight acceleration loads exceed a preset limit, engine bleed air inflates member (28) to expand loops (7). This retracts straps (6) and positions the crew member. Member (28) is allowed to deflate when the acceleration subsides. When the ejection procedure is initiated, a gas generator (44) inflates member (28).

18 Claims, 10 Drawing Figures

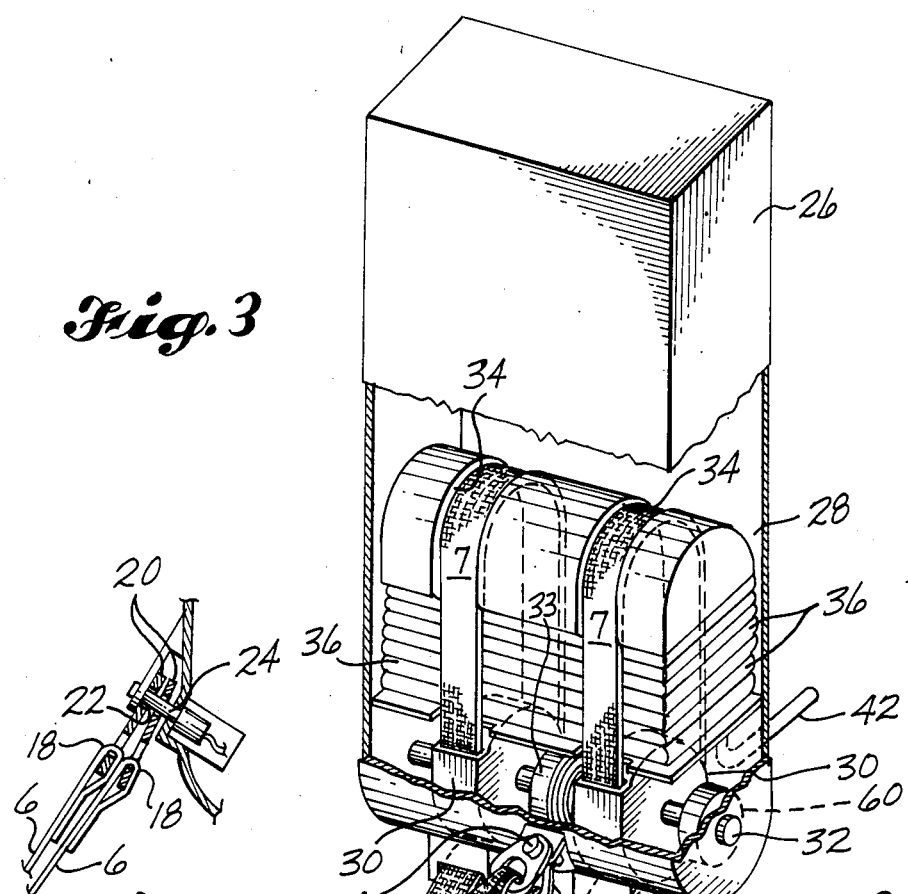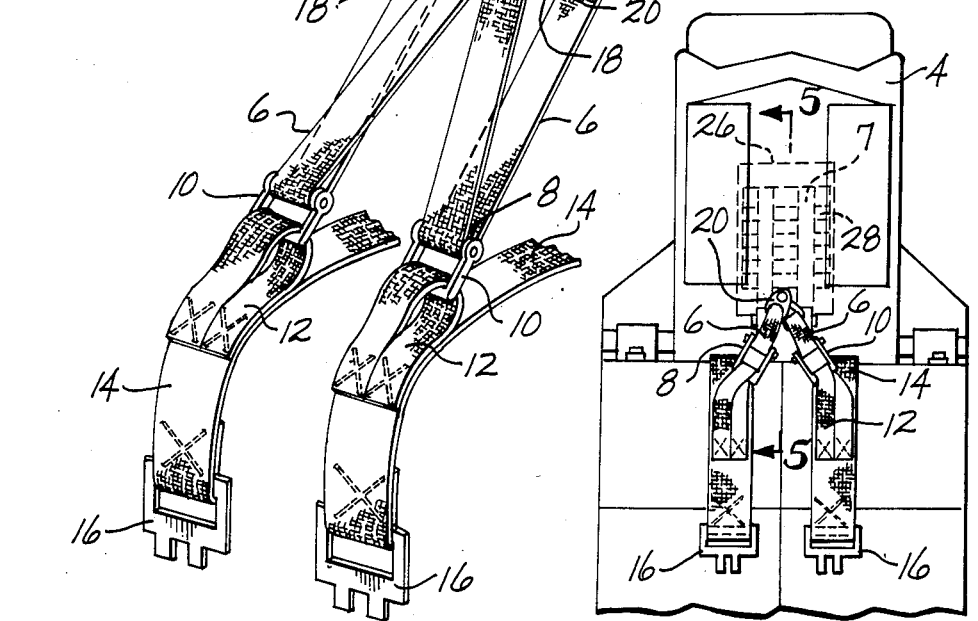

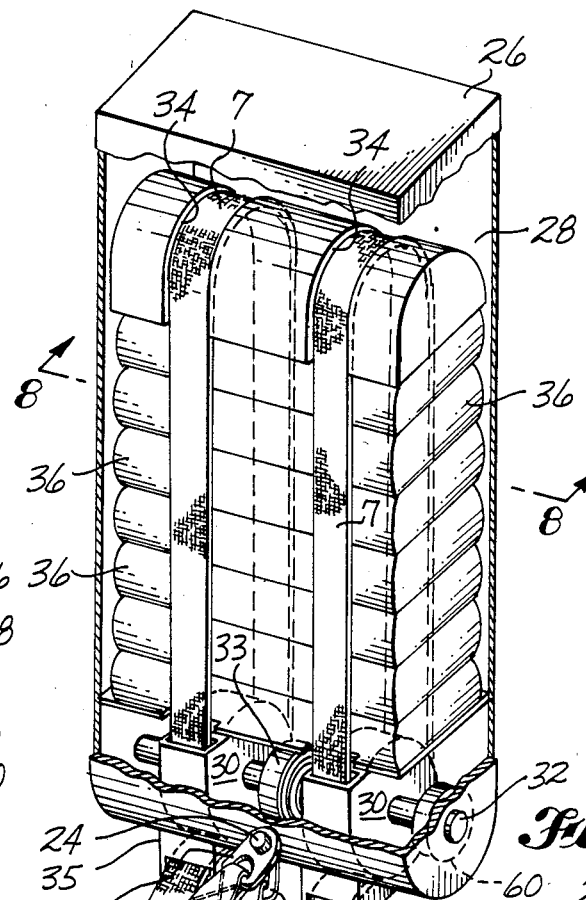
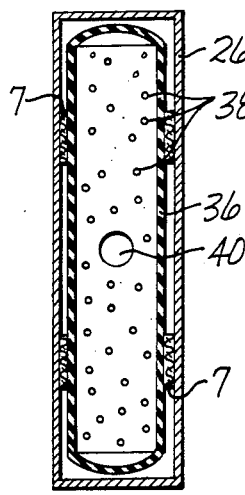
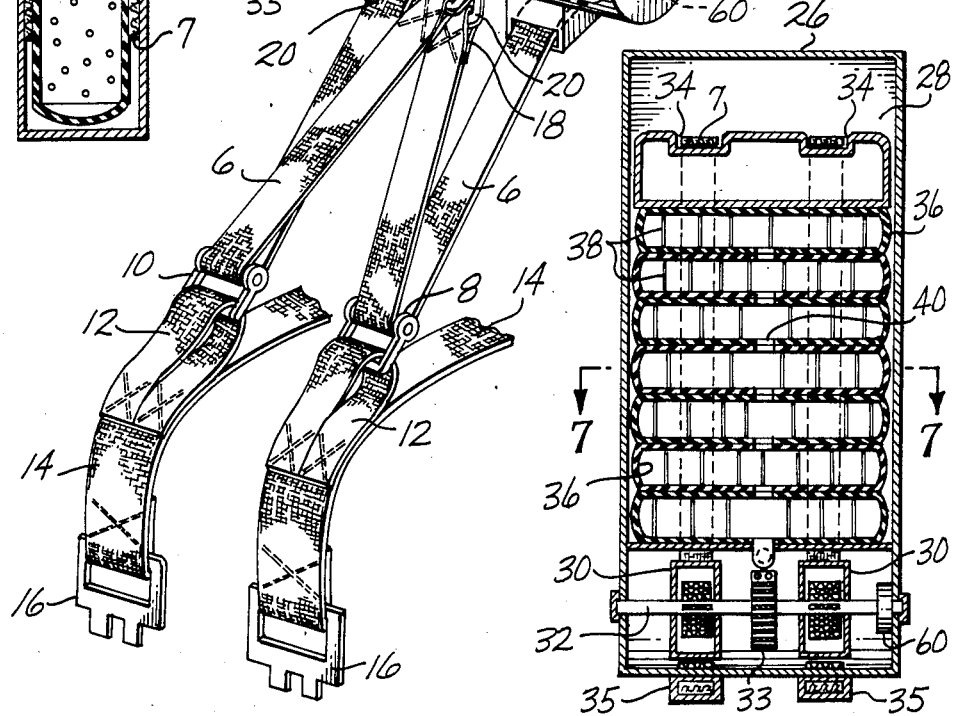

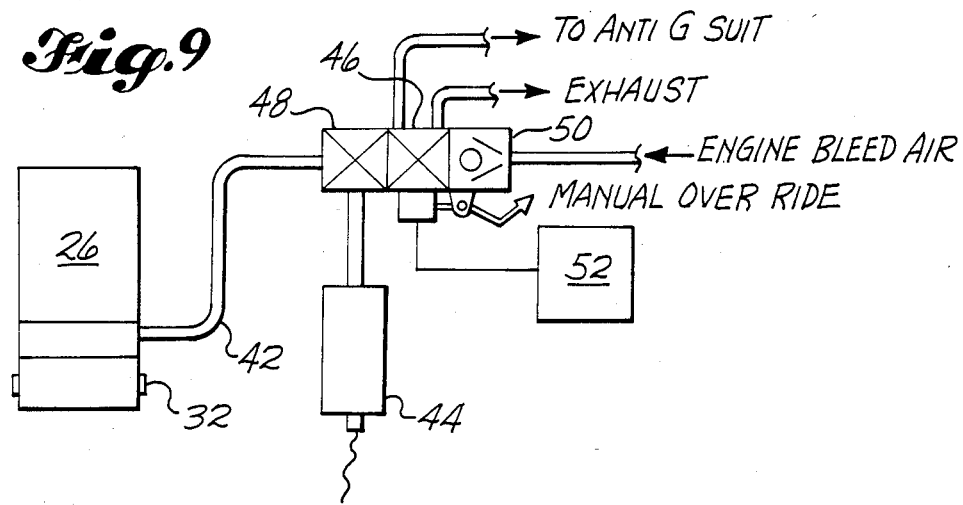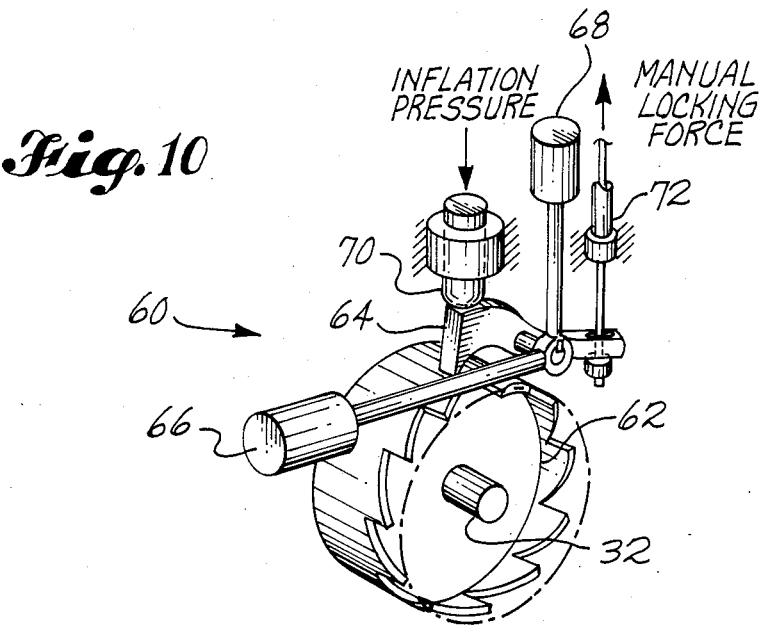

TORSO RESTRAINT WITH IN FLIGHT AND EJECTION ACTIVATION MODES

DESCRIPTION

1. Technical Field

This invention relates to powered haul-back mechanisms for aircraft ejection seat torso restraints and, more particularly, to such a haul-back mechanism which may be actuated a number of times during flight in response to high g force loads, which has an emergency mode of activation when the crewman is to be ejected, and which uses an inflatable accordian device to expand a loop of a restraint strap to haul in the strap.

2. Background Art

It is well-known that upon ejection from an aircraft a crewman experiences dangerously high g forces. In order to protect crewman against injury or even death caused by such g forces, ejection seats currently being used in high performance military aircraft incorporate a torso restraint retraction system to position the crewman for proper spinal alignment prior to ejection. Such current systems are generally actuated by pyrotechnic devices that activate a hauling back or reeling in of shoulder strap restraints. In known systems, these pyrotechnic devices are limited to a single cycle of operation. This limitation to a single cycle is inherent in the nature of pyrotechnic devices and would be impractical to change. Increasing operation capability to more than a single cycle would require storing quantities of gas or pyrotechnic charges that would be impractical from a weight and volume standpoint.

Tactical aircraft currently being developed has increasing maneuvering capability with accompanying increasingly high acceleration loads on the crew members. Resisting such high acceleration or "g" force loads can cause excessive crew fatigue and a decrease in a crew member's peak operating capability. Therefore, there is a need to assist crew members in resisting the g loads experienced in high acceleration maneuvers in order to prevent excessive fatigue and loss of operating capability.

Known torso restraint retraction systems do not fulfill this need because they are not adapted to respond to in flight acceleration conditions. As noted above, systems actuated by pyrotechnic devices are not suitable for providing in flight restraint because of their inherent limitation to a single cycle of operation. Substitute power sources that have been used for retracting torso restraint straps also have severe limitations. Electrically powered haul-back reels would require both high speed—high torque and low speed—high torque capability. This conflicting requirement would result in undue complexity in the system and would probably add unacceptably to cost and weight. Hydraulic devices are not desirable in the cockpit because of the danger of fire and/or toxicity in the event of leakage of the hydraulic fluid.

There are a number of examples in the patent literature of devices having inertia locks and powered haul-back mechanisms that retract aircraft ejection seat shoulder straps when a crew member ejects from the aircraft. Such devices are disclosed in U.S. Pat. Nos. 2,892,602, granted June 30, 1959, to L. Servanty; 3,386,683, granted June 4, 1968, to O. E. Howland; 3,522,918, granted Aug. 4, 1970, to R. J. Wrighton; 3,698,670, granted Oct. 17, 1972, to C. L. Ewing; and 4,437,628, granted Mar. 20, 1984, to M. Schwartz. In the Servanty apparatus, a fairly complex system of mechanical links and a dash pot retracts and tightens the shoulder straps. Howland and Wrighton each disclose a system in which the shoulder straps are retracted by a gas charge that moves a piston which in turn activates a mechanical mechanism. Ewing discloses a system in which, as the straps are retracted, a gas generator inflates a bag behind the lower back of the crewman to prevent spinal fractures. Schwartz discloses a system in which a vest under a harness suit is inflated by a gas generator as the straps are tightened by an inertia reel activated by gas pressure. The vest is described as positioning the crewman's body in the seat.

The patent literature also includes a number of other devices relating to shoulder strap torso restraints in aircraft. U.S. Pat. No. 2,680,476, granted June 8, 1954, to J. L. Saffel discloses a hydraulic snubber for a shoulder harness to prevent personnel from being thrown forward in the event of a crash. In U.S. Pats. Nos. 3,905,615, granted Sept. 16, 1975, and 3,948,541, granted Apr. 6, 1976, M. Schulman discloses inflatable bladders carried by a shoulder and lap harness that are inflated by a gas generator upon sudden acceleration or deceleration. A system for quick escape from an ejection seat in the event of a ground emergency is disclosed in U.S. Pat. No. 3,954,234, granted May 4, 1976, to R. H. Frost et al. D. L. Go, in U.S. Pat. No. 4,396,228, granted Aug. 2, 1983, discloses a multiple anchor point integrated shoulder harness and lap belt having a single point quick release.

Devices for orienting a crew member's seat to alleviate the effect of g forces are disclosed in U.S. Pats. No. 4,004,763, granted Jan. 25, 1977, to F. E. Bunnell III et al; and 4,175,723, granted Nov. 27, 1979, to F. L. Shea, Jr. U.S. Pat. No. 3,096,957, granted July 9, 1963, to L. D. Peterson et al discloses a device in which a ballistic charge causes a reel to rotate rapidly to haul in a strap between a person and a seat to effect man-seat separation. U.S. Pat. No. 3,355,127, granted Nov. 28, 1967, to R. M. Stanley et al discloses a system in which a rocket attached by a tow line to a crew member's harness is ejected from an aircraft and then ignited to pull the crew member out of the aircraft. U.S. Pat. No. 3,488,090, granted Jan. 6, 1970, to D. C. Douglas discloses an automobile shoulder harness with a rachet and pawl inertial lock.

The known devices and the patents discussed above and the prior art cited in such patents should be carefully considered in order to put the present invention into proper perspective relative to the prior art.

DISCLOSURE OF THE INVENTION

A subject of the invention is apparatus in a flight vehicle for retracting a personnel restraint strap on a personnel carrier. In the context of this application, the term "flight vehicle" is intended to be understood as including aircraft, rocket powered vehicles that move through the atmosphere, and spacecraft. Also in the context of this application, the term "personnel carrier" means a seat or other device against which a person rests in a sitting, reclining, or semi-reclining position.

According to an aspect of the invention, the apparatus comprises an inflatable member and lock means for fixing one portion of the strap against movement relative to the carrier. Guide means are provided for guiding a loop portion of the strap around the inflatable member. This loop portion is located between said one portion of the strap and another portion of the strap that is adapted to engage a person situated in the carrier. Control means selectively admits pressurized gas into the inflatable member to inflate and expand such member, to in turn expand the loop portion of the strap and retract the strap.

A feature of the invention is control means that retracts the strap in response to in flight acceleration loads and also when a person situated in the carrier is to be ejected. This dual mode of operation of the apparatus is especially advantageous when the strap being retracted is a torso restraint strap. In apparatus having this dual mode feature, preferably the control means comprises means for admitting engine bleed air into the inflatable member in response to in flight acceleration loads, and means for admitting high pressure gas into the inflatable member when said person is to be ejected from the flight vehicle. The apparatus further comprises release means for releasing the lock means to allow said one portion of the strap to move relative to the carrier and for exhausting engine bleed air from the inflatable member, in response to a subsiding of such in flight acceleration loads.

Another subject of the invention is a system in a flight vehicle for restraining and positioning the torso of a person situated in a personnel carrier. According to an aspect of the invention, the system comprises a torso restraint strap and retraction means for retracting the strap to restrain and position the person's torso. The retraction means is activated by pneumatic pressure. The system also includes a high pressure gas generator. Conduit means communicate the retraction means with the gas generator and a source of engine bleed air. Control means regulate movement of pneumatic fluids through the conduit means, deliver engine bleed air to the retraction means to retract the strap in response to in flight acceleration loads, and deliver high pressure gas from the gas generator to the retraction means to retract the strap when the person is to be ejected from the flight vehicle.

Another subject of the invention is a method of retracting a personnel restraint strap on a personnel carrier in a flight vehicle to restrain a person situated in the carrier. According to an aspect of the invention, the method comprises providing an inflatable member and fixing such member relative to the carrier. A first portion of the strap is also fixed relative to the carrier. A second portion of the strap is positioned to engage the person situated in the carrier. An intermediate portion of the strap between the first and second portions of the strap is guided in a loop around the inflatable member. The inflatable member is inflated to expand the member to in turn expand the loop and retract the strap.

According to a preferred aspect of the invention, the step of inflating includes inflating such member with engine bleed air in response to in flight acceleration loads, and inflating such member with high pressure gas when the person is to be ejected from the flight vehicle. The method further comprises, when such in flight loads subside, releasing the first portion of the strap to allow it to move relative to the carrier, and exhausting engine bleed air from the inflatable member to allow such member to deflate.

Still another subject of the invention is a method of restraining and positioning the torso of a person situated in a personnel carrier in a flight vehicle. According to an aspect of the invention, the method comprises providing a torso restraint strap and a pneumatically activated mechanism for retracting the strap. Engine bleed air is delivered to the mechanism to retract the strap when in flight acceleration loads exceed preset limits. The mechanism is released and the strap is allowed to be extended when the acceleration loads subside below such limits. When required, high pressure gas is delivered to the mechanism to retract the strap and restrain and position the person for ejection from the flight vehicle.

Yet another subject of the invention is an inflatable member. According to an aspect of the invention, the inflatable member comprises a plurality of inflatable slabs stacked together. Each slab has wall means that defines an interior cavity. The wall means includes first and second opposing walls. A multiplicity of fibers connects the first and second walls of each slab. Manifold means communicates the interior cavities with each other. This structure of an inflatable member has the advantages of providing uniform expansion and uniform collapse of the member. In addition, the member may be expanded under both high fluid pressures and relatively low fluid pressures. In either case, essentially no ballooning or uneven expansion of the walls of the member occurs.

The method and apparatus of the invention provide retracting means that has numerous advantages. The structure of the retracting apparatus is relatively simple and easy and inexpensive to manufacture. In addition, the structure may easily be made lightweight and compact. Both of these characteristics are especially advantageous in an aircraft environment. The operation of the retraction means of the invention is relatively simple and highly reliable. The operation is also quite flexible and readily adaptable to respond to a variety of different situations.

The versatility and economy of the invention is greatly enhanced by the aspect of the invention that enables a single mechanism to be used to retract a strap any number of times during in flight operation and also to retract the strap in preparation for ejection. This aspect allows a single mechanism of economical and reliable construction to solve two problems, fatigue due to in flight acceleration loads and injury incurred during ejection. The system of the invention is capable of addressing both problems with a single mechanism partially because the mechanism of the invention may be activated by either of the two different levels of pressure required in the two situations. This ability to be activated by different levels of pressure, and thus different pressure sources, adds greatly to the versatality of the system of the invention.

These and other advantages and features will become apparent from the detailed description of the best mode for carrying out the invention that follows.

BRIEF DESCRIPTION OF THE DRAWINGS

In the drawings, like designations refer to like parts throughout, and:

FIG. 3 is a pictorial view of the preferred embodiment of the retracting mechanism in its nonretracting position, with portions of the housing cut away.

FIG. 4 is like FIG. 3 except that it shows the mechanism in its inflated, retracting position.

FIG. 5 is a sectional view taken along the line 5—5 in FIG. 6.

FIG. 6 is a front elevational of the mechanism shown in FIG. 4, with portions of the ejection seat added.

FIG. 7 is a sectional view taken along the line 7—7 in FIG. 8.

FIG. 8 is a sectional view taken along the line 8—8 in FIG. 4.

FIG. 9 is a schematic diagram of the control and pneumatic fluid supply system of the preferred embodiment.

FIG. 10 is a pictorial view of one type of inertial lock suitable for use in the preferred embodiment.

BEST MODE FOR CARRYING OUT THE INVENTION

Figure 1:
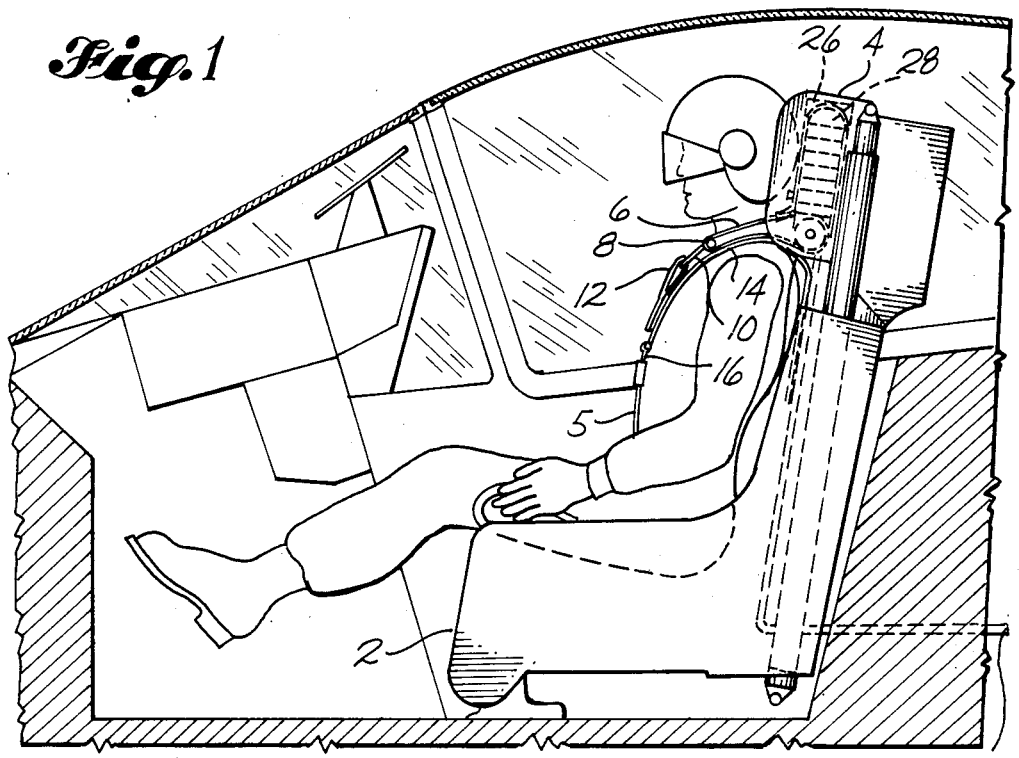
FIG. 1 is a side elevational view of the preferred embodiment of the apparatus of the invention incorporated into an aircraft ejection seat and restraining a person sitting in the seat, with parts shown in section.

The drawings show apparatus that is constructed according to the invention and that also constitutes the best mode of the apparatus of the invention currently known to the applicant. The drawings also illustrate the best mode of the method of the invention known to the applicant. In the drawings, the powered retraction of shoulder torso restraint straps 6 in an aircraft ejection seat 2 is illustrated. The retraction is accomplished when ejection procedures are commenced or when crew members are subjected to high g force loads during in flight operation. In the first case, the retraction helps to properly align the body of a crew member in order to prevent injury during ejection. In the second case, the retraction aligns the body to assist the crew member in resisting the g force loads to in turn prevent excessive fatigue and loss of operating capability. It is anticipated that the primary use environment of the present invention will be that shown in the drawings and described herein in detail. However, it is of course to be understood that many of the important features of the invention may also be used to advantage in a variety of other situations.

Figure 2:
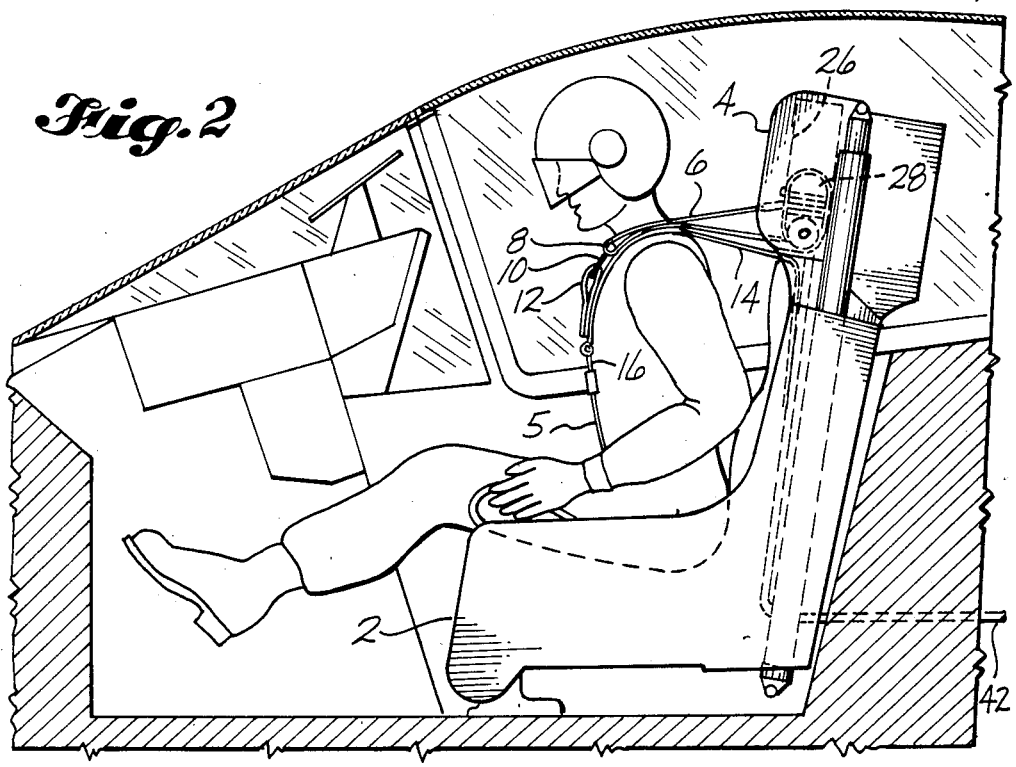
FIG. 2 is like FIG. 1 except that it shows the apparatus in a nonrestraining mode and the person leaning forward.

FIGS. 1 and 2 illustrate an aircraft cockpit in which a crew member is seated in an ejection seat 2. The seat 2 may be of any of the various types that are currently known. Since the details of the structure of the seat 2 are not a part of the present invention, they will not be described in any detail herein.

As shown in FIGS. 1 and 2, the crewman is wearing a harness 5. Attached to the harness 5 are parachute riser straps 14 and torso restraint straps 6 that extend over the shoulders of the crewman. One end 18 of each of the shoulder straps 6 is fixed to the headrest 4 of the ejection seat 2 by means of a pin 24. This pin 24 is of a type that will retract and release the ends 18 of the straps 6 when it is desired to separate the crew member from the seat 2 following ejection. As can be seen in FIGS. 3–5, the fixed end 18 of each strap 6 is looped through a fitting 20 in a known manner. Each fitting 20 is provided with a hole 22 for receiving the pin 24. In the embodiment shown in the drawings, the two fittings 20 are placed one over the other at a laterally center location on the headrest 4 so that they may be secured to the headrest 4 by a single pin 24. See FIG. 5.

Referring to FIGS. 1–4 and 6, straps 6 extend generally horizontally outwardly from fittings 20. The two straps 6 diverge from each other, and each one is looped around a roller fitting 8. The two rollers fittings 8 rest on opposite forward shoulder portions of the crew member, as shown in FIGS. 1 and 2. Each of the rollers 8 is journaled in one end of a U-shaped fitting 10. The other end of fitting 10 has attached thereto a connector strap 12. Each strap 12 is in turn attached by any suitable means to one of the parachute riser straps 14. The outer end of each riser strap 14 carries a harness attachment fitting 16. When a crew member boards the aircraft, he is already wearing his harness 5. He seats himself in the ejection seat 2 and attaches his harness 5 to the parachute riser straps 14 and the shoulder torso restraint straps 6 by means of these harness attachment fittings 16.

In the retraction apparatus of the invention, the restraint strap to be retracted is looped around an inflatable member. This inflatable member is inflated to expand its size and to increase the size of the loop of the restraint strap. The increasing of the loop size in turn retracts the strap.

An important feature of the invention is retracting apparatus that has two modes of operation. The first mode of operation is activated in response to g loads created by in flight maneuvering of the aircraft. The second mode operates in response to initiation of the ejection procedure. The first mode is powered by engine bleed air, while the second mode is powered by a gas generator that provides high pressure gas.

In the preferred embodiment shown in the drawings, the retracting apparatus includes an inflatable member 28 in a housing 26. Both member 28 and housing 26 are fixed relative to the seat 2. As shown in the drawings, the preferred location for mounting the housing 26 is in the headrest 4 of the ejection seat 2. However, it is of course to be understood that the housing 26 and inflatable member 28 could also be located in or on other parts of the ejection apparatus without departing from the spirit and scope of the invention. In the preferred embodiment, a winding mechanism is located inside the housing 26 below the inflatable member 28. See FIGS. 3, 4, and 8. This winding mechanism includes a shaft 32 on which are mounted two reels 30, one corresponding to each shoulder strap 6. In order to bias the shoulder straps 6 into a retracted position, the shaft 32 is provided with a torsion spring 33 that continuously exerts a force tending to rotate shaft 32 and reels 30 in a direction that winds the inner end of each strap 6 around its respective reel 30 to retract the strap 6.

Each strap 6 extends from its fixed end 18, around its respective roller fitting 8, and to the retracting apparatus of the invention. Each strap 6 extends from its roller fitting 8 into the headrest 4 and then into the housing 26 of the retracting apparatus. As can be most clearly seen in FIGS. 3 and 4, each strap 6 extends under the housing 26 to the back of the housing 26 and then up into the housing 26, around the inflatable member 28, and back down to its respective reel 30. The inner end of the strap 6 may be attached to its reel 30 by any suitable fastening means.

Referring to FIGS. 3, 4, and 8, the top of inflatable member 28 is provided with two guide channels 34 which receive straps 6. These channels 34 serve to guide straps 6 and to keep them in proper position relative to the member 28. The channels 34 also provide bearing surfaces for the straps 6. The walls of the channels 34 are provided with a coating to minimize friction between the straps 6 and the member 28. This coating may take a variety of forms. An example of a sutiable coating would be one made from the material sold under the trademark Teflon. The bottom of the housing 26 has two guide members 36 each of which provides a guide channel for receiving one of the shoulder straps 6. The interior surfaces of the channels formed by these guide members 35 are preferably provided with a coating like the coating on the guide channels 34 in order to minimize friction between straps 6 and housing 26.

The inflatable member 28 may of course vary considerably in configuration. The preferred embodiment of the inflatable member 28 shown in the drawings is about the size and general shape of a large telephone directory. The member 28 may be a single chamber continuous bellows, or it may include a stack of separate inflatable members 36. The structural details of the preferred embodiment are shown in FIGS. 7 and 8. In the preferred embodiment, the complete inflatable member 28 includes a plurality of inflatable slabs 36 that are stacked together to form member 28. The slabs 36 are secured together by a suitable adhesive. Manifold means communicates the interior cavities of slabs 36 with each other. In the preferred embodiment, the slabs 36 are manifolded together by internal ports 40. Thus, pneumatic pressure from a single inlet conduit 42 will inflate and expand each of the slabs 36. Each slab 36 is generally flat and oblong and has a mulitplicity of fibers 38 connecting its opposing top and bottom walls. This arrangement of separate relatively small inflatable members 36 and fibers 38 that restrain the expansion of such members 36 provides a very accurate control of the shape of the overall inflatable member 28 and helps to ensure uniform inflation and deflation of the different parts of the inflatable member 28. The arrangement also has the advantage of operating under relatively low pneumatic pressures.

As noted above, the shaft 32 is provided with a spring 33 for exerting a continuous retracting force on the shoulder straps 6. During normal operation of the aircraft when the g loads on the crew members are relatively low, a crew member seated in ejection seat 2 can lean forward to perform whatever tasks he might choose. In order to lean forward, the crew member need only exert enough pressure on the shoulder straps 6 to overcome the force of the spring 33. When the crew member again leans back in the seat 2, the spring 33 will return straps 6 to a more retracted position so that straps 6 always exert a torso restraining force on the crew member.

The shaft 32 is also provided with an inertial lock 60. This lock 60 automatically locks shaft 32 against further rotation when the g forces tending to move the crew member upwardly or forwardly exceed preset limits. This fixes the inner ends of straps 6 against movement relative to the seat 2 and prevents the crew member from being thrown forwardly or upwardly out of the seat 2. The lock 60 may take any of a variety of known forms. FIG. 10 illustrates just one of the many types of inertial locks that would be suitable. Referring to FIG. 10, the lock 60 includes a ratchet wheel 62 and a pawl 64. A vertical inertial means 66 causes pawl 64 to engage ratchet wheel 62 in response to vertical acceleration exceeding the preset limit. Horizontal inertial mass 68 causes pawl 64 to engage the ratchet wheel 62 in response to horizontal acceleration exceeding the preset limit. The engagement of ratchet wheel 62 by pawl 64 prevents any further rotation of shaft 32. Lock 60 is also provided with a cable 72 for manual activation of the lock 60. A push rod activator 70 pushes pawl 64 into engagement with ratchet wheel 62 in response to pneumatic pressure in the inflatable member 28.

FIG. 9 is a schematic diagram of the pneumatic pressure supply system and control system of the restraint retraction apparatus. The inflatable member 28 is connected to a source of engine bleed air and a pyrotechnic gas generator 44 by means of an inlet conduit 42. There are two valves 46, 48 in the conduit 42 between the inflatable member 28 and the source of engine bleed air. The first valve 46 is a servo control valve that is activated by an acceleration sensor 52. This valve 46 has an open position in which it admits engine bleed air into the inflatable member 28 and, if desired, also to inflatable portions of an anti g force suit of a known type. The valve 46 also has an exhaust position in which the inflatable member 28 and the anti g suit are open to the cockpit atmosphere. The second valve 48 is positioned between the first valve 46 and the inflatable member 28. This valve 48 has a normal positon in which it freely allows flow from the engine bleed air source to the inflatable member 28. When the ejection procedure is initiated, the high pressure gas generator 44 is activated and the gas from the generator 44 in turn causes valve 48 to move to a second position in which the source of engine bleed air is closed off from the inflatable member 28 and the gas generator 44 communicates with member 28. In the preferred embodiment, both valves 46, 48 are of a shuttle spool type, but it is of course to be understood that various types of valves could be used without departing from the spirit and scope of the invention. In addition to the two valves 46, 48, there is preferably provided a check valve 50 to prevent flow in the direction of the engine bleed air source.

The manner of operation of the restraint apparatus of the invention is as follows. While the aircraft is in flight and the crew member is not under any g loads exceeding the preset limits, the inflatable member 28 remains in the deflated condition shown in FIGS. 2 and 3, the inertial lock 60 remain disengaged, and the crew member is free to lean forward for a reasonable distance, for example about eighteen inches. See FIG. 2. When the crew member leans forward, the straps 6 are pulled off of their reels 30, around member 28, and out of the head rest 4. As the straps 6 are extended, shaft 32 is rotated and spring 33 is wound further around shaft 32. The crew member feels the resistance of spring 33 but is able to lean forwardly without any difficulty.

When the acceleration sensor 52 senses accelerations that exceed any of the preset limits, servo valve 46 opens to admit engine bleed air to the inflatable member 28. The inertial lock 60 is set to lock at accelerations exceeding the preset limits. Therefore, each time during in flight operation of the aircraft that the g force loads on the crew member exceed the preset limits, the shaft 32 is locked against rotation and the inflatable member 28 is inflated with engine bleed air. FIGS. 1, 4, 6, and 8 show member 28 fully inflated. As member 28 expands, the loop portion 7 of each strap 6 that extends around inflatable member 28 expands with the member 28. With the shaft 32 locked against rotation, the expansion of loop 7 causes each strap 6 to be retracted into the housing 26 of the retraction apparatus. The retraction of straps 6 restrains the torso of the crewman and pulls him back against the seat 2 into the position shown in FIG. 1. This torso restraint and positioning of the crewman places him in a position in which his spine is aligned and he is held against the seat in a manner that assists him in resisting the high acceleration loads to in turn prevent the development of excess fatigue.

When the acceleration subsides below the preset limits, valve 46 moves to its exhaust position in which it communicates the inflatable member 28 with the atmosphere. The air in inflatable member 28 is allowed to exhaust from member 28. In response to the decrease in the accelation loads and the lowering of the pressure inside member 28, the inertial lock 60 unlocks, thus allowing the spring 33 to rotate shaft 32 and rewind the strap 6 onto their reels 30. This takes up the slack of the straps 6 caused by the deflating of member 28. With the shaft 32 again free to rotate and member 28 deflated, the crew member is again free to move forward and lean back until the next time the acceleration loads exceed the preset limits.

As can be seen in FIG. 10, the inertial lock 60 has two means of activation in response to acceleration loads exceeding the preset limits. The lock 60 is activated by the action of the inertial masses 66, 68 in a known manner. In addition, the presence of pneumatic pressure in member 28 activates push rod 70 to ensure that lock 60 is always in a lock position when member 28 is inflated. Still referring to FIG. 10, lock 60 may also be manually activated by pulling on a suitable handle or lever (not shown) to in turn pull manual activation cable 72. As shown in FIG. 10, the gas supply system for the inflatable member 28 may also be provided with a manual override. This manual override could be activated by the same handle or lever that activates lock 60. Such manual operation capability would enable a crew member to activate the retraction system if he knew that he was going to experience high g load conditions for more than a few seconds.

In emergency situations of a type requiring the crew member to eject, the ejection procedure would be initiated in any of a number of known ways. The initiation of the ejection procedure triggers in a known manner the pyrotechnic gas generator 44, which in turn activates valve 48 to close off the source of engine bleed air and communicate inflatable member 28 with the gas generator 44. The presence of gas pressure in member 44 in turn activates inertial lock 60 if lock 60 is not already in a lock position. The pyrotechnic gas generator 44 inflates member 28 in much the same manner as member 28 is inflated by the engine bleed air during in flight operation. However, gas generator 44 delivers gas to member 28 at pressures of up to three or four times the engine bleed air pressure. The higher inflation pressures provided by the gas generator 44 are necessary in order to restrain the crewman under the severe acceleration conditions encountered during ejection. Following ejection, member 28 is deflated by exhausting the gas therein and pin connection 24 is released in any of various known ways in order to permit seat/man separation.

In most situations, the aircraft will be operated normally and will land without any need for the crew members to eject. In such situations the restraint apparatus is fully intact at the end of the flight. Therefore, the apparatus is ready for the next flight with only routine maintainance.

It is to be understood by those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined in the following claims.

What is claimed is:

1. In a flight vehicle, apparatus for retracting a personnel torso restraint strap on a personnel carrier, said apparatus comprising:
   lock means for fixing one portion of the strap against movement relative to the carrier;
   an inflatable member;
   guide means for guiding a loop portion of the strap around the inflatable member, said loop portion being located between said one portion of the strap and another portion of the strap that is adapted to engage a person situated in the carrier;
   control means for admitting pressurized gas into the inflatable member in response to in flight acceleration loads, to inflate and expand said member, to in turn expand said loop portion and retract the strap; and
   release means for releasing the lock means to allow said one portion of the strap to move relative to the carrier and for exhausting said gas from the inflatable member, in response to a subsiding of such in flight acceleration loads.

2. In a flight vehicle, apparatus for retracting a personnel torso restraint strap on a personnel carrier, said apparatus comprising:
   lock means for fixing one portion of the strap against movement relative to the carrier;
   an inflatable member;
   guide means for guiding a loop portion of the strap around the inflatable member, siad loop portion being located between said one portion of the strap and another portion of the strap that is adapted to engage a person situated in the carrier;
   control means for selectively admitting pressurized gas into the inflatable member to inflate and expand said member, to in turn expand said loop portion and retract the strap; said control means comprising means for admitting engine bleed air into the inflatable member in response to in flight acceleration loads, and means for admitting high pressure gas into the inflatable member when said person is to be ejected from the flight vehicle; and
   release means for releasing the lock means to allow said one portion of the strap to move relative to the carrier and for exhausting engine bleed air from the inflatable member, in response to a subsiding of such in flight acceleration loads.

3. Apparatus as described in claim 1, in which the inflatable member comprises a plurality of inflatable slabs stacked together, each such slab having wall means defining an interior cavity, and said wall means including first and second opposing walls; a multiplicity of fibers extending through the interior of said cavity and connecting said first and second walls of each slab; and manifold means communicating said interior cavities with each other.

4. Apparatus as described in claim 2, in which the inflatable member comprises a plurality of inflatable slabs stacked together, each such slab having wall means defining an interior cavity, and said wall means including first and second opposing walls; a multiplicity of fibers connecting said first and second walls of each slab; and manifold means communicating said interior cavities with each other.

5. Apparatus as described in claim 3, in which the guide means comprises a channel extending across a top portion of the inflatable member for slidably receiving said loop portion, said channel having bearing surface means with a coating that reduces friction between said loop portion and the inflatable member.

6. Apparatus as described in claim 1, further comprising means for admitting high pressure gas into the inflatable member when said person is to be ejected from the flight vehicle, said high pressure gas having a higher pressure than said pressurized gas to restrain said person under severe acceleration conditions during ejection from the flight vehicle.

7. Apparatus as described in claim 1, in which the guide means comprises a channel extending across a top portion of the inflatable member for slidably receiving said loop portion, said channel having bearing surface means with a coating that reduces friction between said loop portion and the inflatable member.

8. In a flight vehicle, a system for restraining and positioning the torso of a person situated in a personnel carrier, said system comprising:
  a torso restraint strap;
  retraction means for retracting said strap to restrain and position the torso of said person, said retraction means being activated by pneumatic pressure;
  a high pressure gas generator;
  conduit means communicating the retraction means with the gas generator and a source of engine bleed air; and
  control means for regulating movement of pneumatic fluids through the conduit means, for delivering engine bleed air to the retraction means to retract the strap in response to in flight acceleration loads, and for delivering high pressure gas from said generator to the retraction means to retract the strap when said person is to be ejected from the flight vehicle.

9. A system as described in claim 8, in which the retraction means includes an inflatable member, and guide means for guiding a loop portion of the strap around the inflatable member; and the control means delivers engine bleed air and high pressure gas to the inflatable member to inflate and expand said member to in turn expand said loop portion and retract the strap.

10. A system as described in claim 9, in which the inflatable member comprises a plurality of inflatable slabs stacked together, each such slab having wall means defining an interior cavity, and said wall means including first and second opposing walls; a multiplicity of fibers connecting said first and second walls of each slab; and manifold means communicating said interior cavities with each other.

11. Apparatus as described in claim 9, in which the guide means comprises a channel extending across a top portion of the inflatable member for slidably receiving said loop portion, said channel having bearing surface means with a coating that reduces friction between said loop portion and the inflatable member.

12. A method of retracting a personnel torso restraint strap on a personnel carrier in a flight vehicle to restrain a person situated in the carrier, said method comprising:
  providing an inflatable member and fixing such member relative to the carrier;
  locking a first portion of the strap relative to the carrier;
  positioning a second portion of the strap to engage said person;
  guiding an intermediate portion of the strap between said first and second portions in a loop around the inflatable member;
  inflating the inflatable member in response to in flight acceleration loads, to expand said member to in turn expand said loop and retract the strap; and
  when said in flight loads subside, releasing said first portion of the strap to allow it to move relative to the carrier, and exhausting said gas from said member to allow said member to deflate.

13. A method as described in claim 12, which further comprises inflating said member with high pressure gas when said person is to be ejected from the flight vehicle.

14. A method of restraining and positioning the torso of a person situated in a personnel carrier in a flight vehicle, said method comprising:
  providing a torso restraint strap and a pneumatically activated mechanism for retracting said strap;
  delivering engine bleed air to said mechanism to retract said strap when in flight acceleration loads exceed preset limits;
  releasing said mechanism and allowing said strap to be extended when said acceleration loads subside below said limits; and
  when said person is to be ejected from the flight vehicle, delivering high pressure gas having a pressure higher than said bleed air to said mechanism to retract said strap and restrain and position said person for ejection from the flight vehicle.

15. A method as described in claim 14, which further comprises providing said mechanism with an inflatable member, and guiding a portion of the strap in a loop around the inflatable member; and in which the steps of delivering engine bleed air and of delivering high pressure gas include introducing said air and said gas, respectively, into the inflatable member to inflate and expand said member to in turn expand said loop and retract the strap.

16. In a flight vehicle, apparatus for retracting a personnel restraint strap on a personnel carrier, said apparatus comprising:
  lock means for fixing one portion of the strap against movement relative to the carrier;
  an inflatable member having a plurality of inflatable slabs stacked together, each such slab having wall means defining an interior cavity, and said wall means including first and second opposing walls; a multiplicity of fibers extending through the interior of said cavity and connecting said first and second walls of each slab; and manifold means communicating said interior cavities with each other;
  guide means for guiding a loop portion of the strap around the inflatable member, said loop portion being located between said one portion of the strap and another portion of the strap that is adapted to engage a person situated in the carrier; and
  control means for selectively admitting pressurized gas into the inflatable member to inflate and expand said member, to in turn expand said loop portion and retract the strap.

17. Apparatus as described in claim 16, in which the guide means comprises a channel extending across a top portion of the inflatable member for slidably receiving said loop portion, said channel having bearing surface means with a coating that reduces friction between said loop portion and the inflatable member.

18. A method of retracting a personnel restraint strap on a personnel carrier in a flight vehicle to restrain a person situated in the carrier, said method comprising:
  providing an inflatable member and fixing such member relative to the carrier;

fixing a first portion of the strap relative to the carrier;
positioning a second portion of the strap to engage said person;
guiding an intermediate portion of the strap between said first and second portions in a loop around the inflatable member;
inflating the inflatable member to expand said member to in turn expand said loop and retract the strap, including inflating said member with engine bleed air in response to in flight acceleration loads and inflating said member with high pressure gas when said person is to be ejected from the flight vehicle; and
when said in flight loads subside, releasing said first portion of the strap to allow it to move relative to the carrier, and exhausting engine bleed air from said member to allow said member to deflate.

* * * * *